United States Patent
Matoba et al.

(10) Patent No.: US 6,392,669 B1
(45) Date of Patent: May 21, 2002

(54) SCHEDULE MANAGEMENT SYSTEM AND METHOD FOR DISPLAYING, MANAGING, AND CHANGING A SCHEDULE AND RECORDING MEDIUM FOR STORING THE SAME

(75) Inventors: Nobumitsu Matoba, Yokohama; Kenichi Nagashima; Michikazu Hirota, both of Machida, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,956

(22) Filed: Jul. 30, 1999

(30) Foreign Application Priority Data

Aug. 10, 1998 (JP) .......................................... 10-225822

(51) Int. Cl.[7] ........................... G06F 3/00; G06F 17/60; G06F 15/16
(52) U.S. Cl. ...................... 345/751; 345/759; 345/763; 345/733; 705/9; 709/205
(58) Field of Search ........................ 345/733, 741–742, 345/744–745, 751, 759, 963; 705/8, 9; 707/10; 709/201, 205

(56) References Cited

U.S. PATENT DOCUMENTS

| | | | | |
|---|---|---|---|---|
| 5,907,829 A | * | 5/1999 | Kida | 705/9 |
| 5,960,406 A | * | 9/1999 | Rasansky et al. | 705/9 |
| 6,085,166 A | * | 7/2000 | Beckhardt et al. | 705/9 |
| 6,101,480 A | * | 8/2000 | Conmy et al. | 705/9 |
| 6,269,369 B1 | * | 7/2001 | Robertson | 707/10 |
| 6,272,074 B1 | * | 8/2001 | Winner | 705/8 X |
| 6,278,456 B1 | * | 8/2001 | Wang et al. | 345/963 X |

* cited by examiner

Primary Examiner—Raymond J. Bayerl
Assistant Examiner—K. L. Bautista
(74) Attorney, Agent, or Firm—Louis J. Percello; McGinn & Gibb, PLLC

(57) ABSTRACT

A schedule management system and method of displaying a schedule of at least a part of a plurality of users on a schedule management apparatus includes a display screen and an input device, and manages personal schedule information registered for each of the plurality of users. The method includes obtaining user identification information which uniquely identifies each of said specified plurality of users, displaying a sum schedule input area on said display screen to input a common schedule to said specified plurality of users in response to said operation, detecting that schedule information including a schedule starting time and a schedule ending time has been inputted in said sum schedule input area, generating a sum schedule number corresponding to the schedule information inputted in said sum schedule input area, registering schedule information inputted in said sum schedule input area as personal schedule information of each of said specified plurality of users and registering said sum schedule number in correlation to said personal schedule information, and displaying a schedule of at least a part of said specified plurality of users based on the personal schedule information of said at least a part of said plurality of users.

20 Claims, 9 Drawing Sheets

[Figure 1]
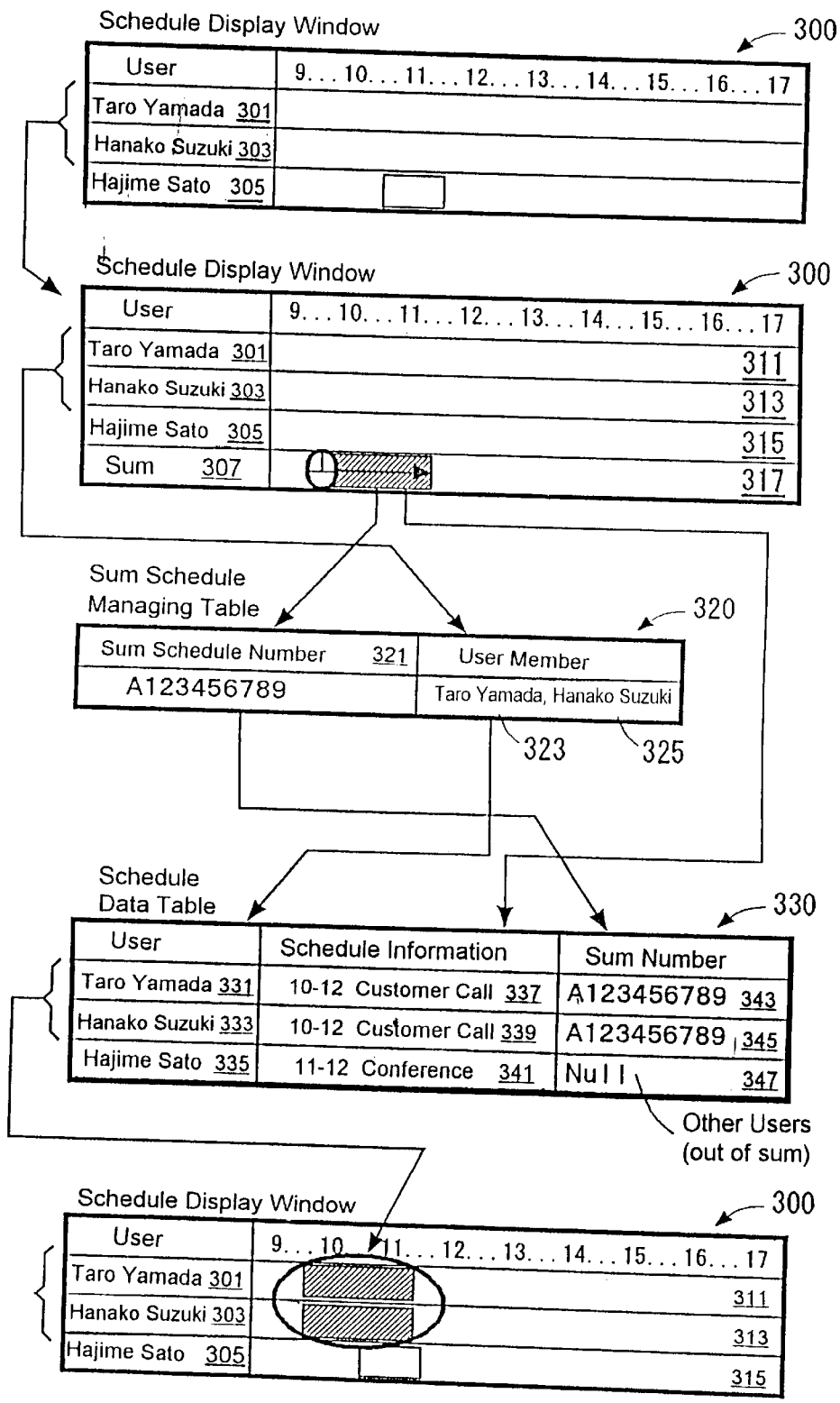

[Figure 2]
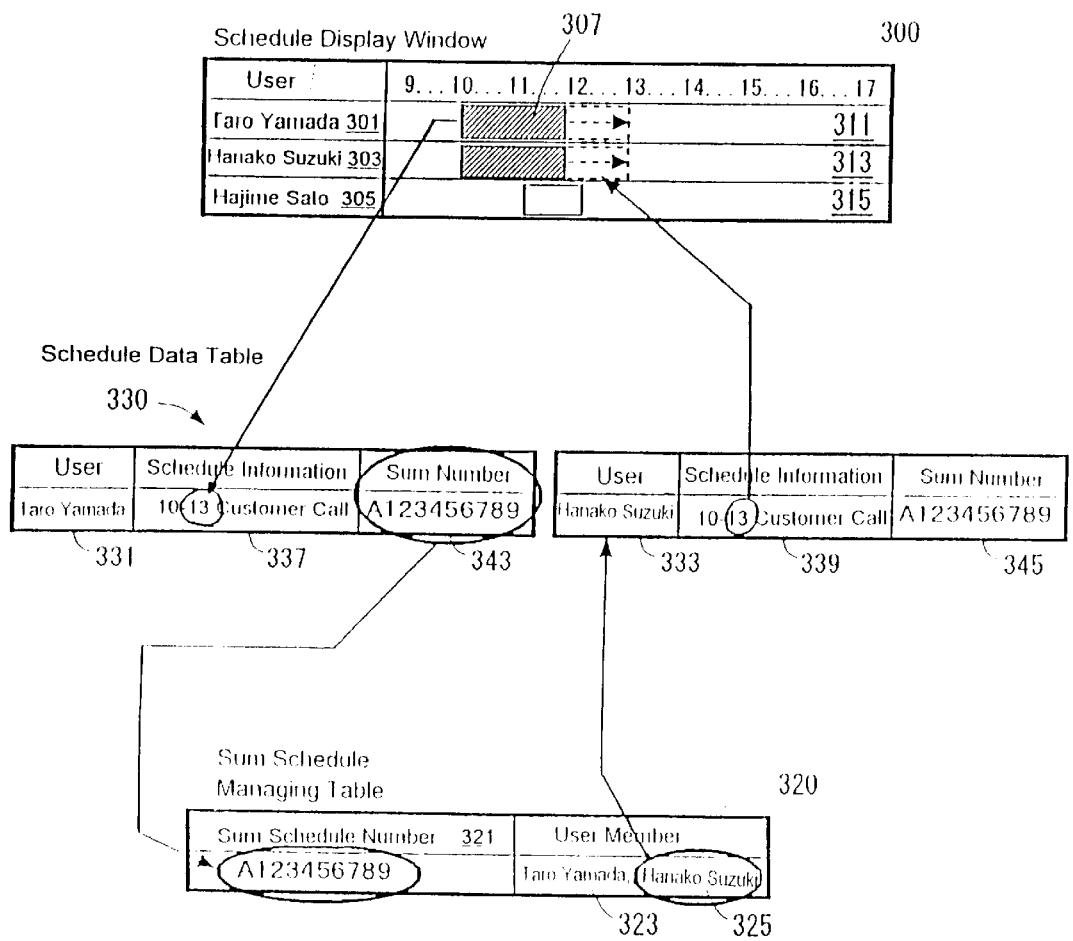

[Figure 3]
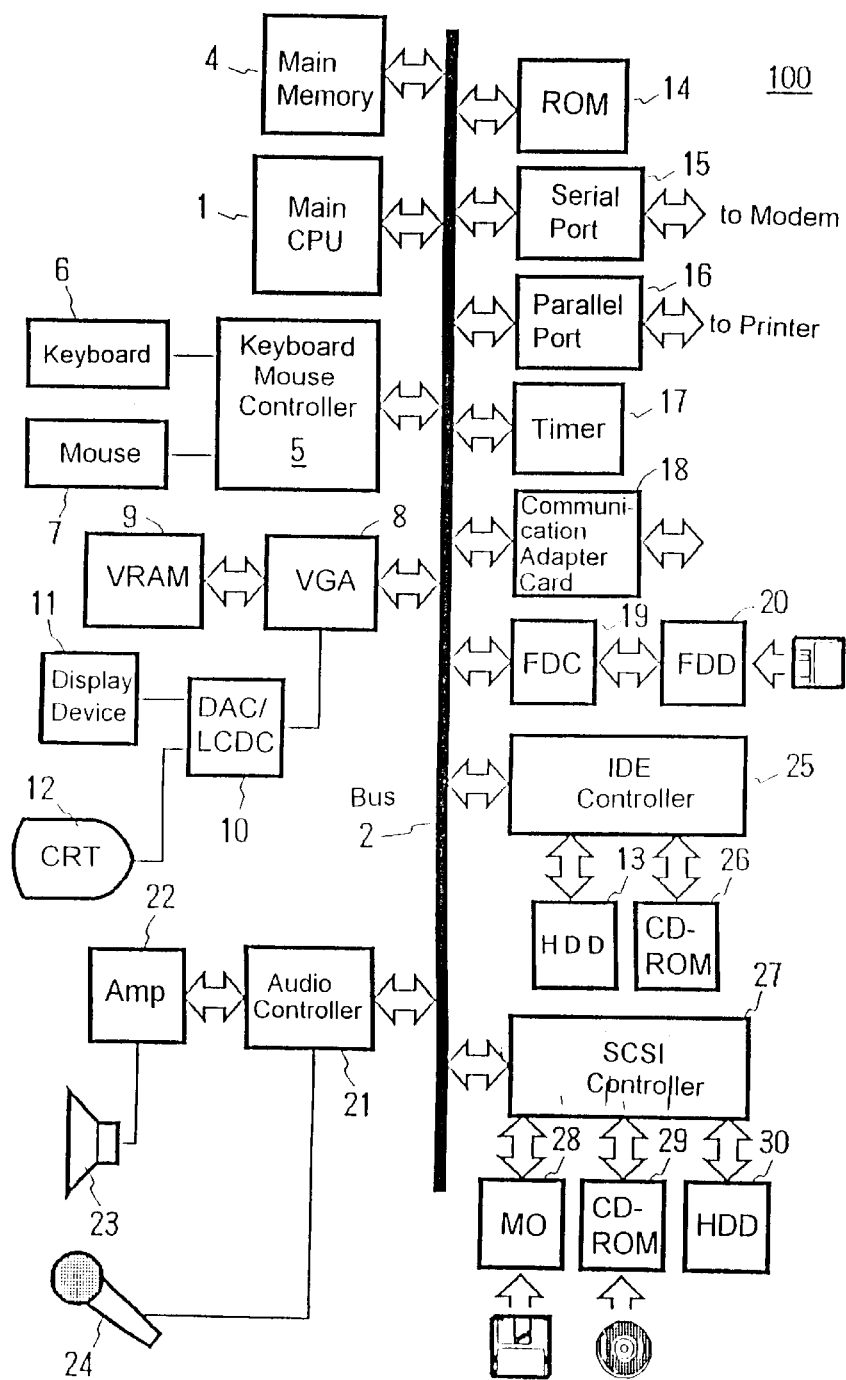

[Figure 4]
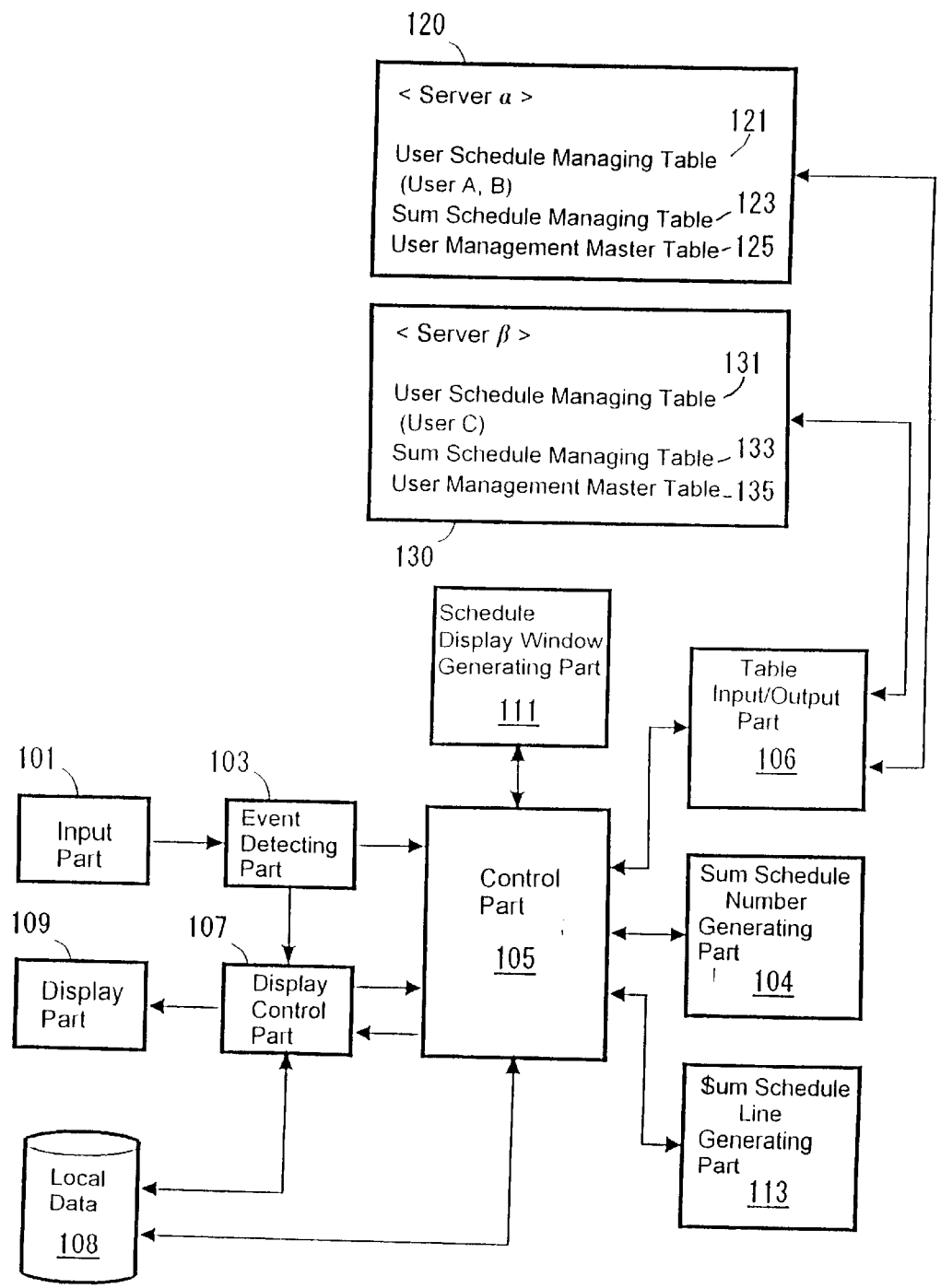

[Figure 5]

210
User Management Master Table  211    213    215

| User Name (User ID) | Schedule Data Table Server | Name of Section User Belongs |
|---|---|---|
| Taro Yamada (Taro Yamada / IBM) | Hakozaki Server / IBM | . |
| Hanako Suzuki (Hanako Suzuki / IBM) | Roppongi Server / IBM | . |
| Jiro Tanaka (Jiro Tanaka / IBM) | Hakozaki Server / IBM | . |
| . | . | . |

[Figure 6]

220
User Schedule Data Table  221  223  225  227  229  231  233

| User Name (User ID) | Date | Start Time | End Time | Subject | Place | Sum Schedule Number |
|---|---|---|---|---|---|---|
| Taro Yamada (Taro Yamada / IBM) | 1998/7/20 | 15:00 | 16:00 | Sales Meeting | 6F Conf. Rm., Hakozaki | ABCDEFG123456 |
| Taro Yamada (Taro Yamada / IBM) | 1998/7/25 | 10:00 | 11:30 | Call ABCD Co | Vendor Rm., ABCD Co | . |
| Hanako Suzuki (Hanako Suzuki / IBM) | 1998/7/20 | 15:00 | 16:00 | Sales Meeting | 6F Conf. Rm., Hakozaki | ABCDEFG123456 |
| Jiro Tanaka (Jiro Tanaka / IBM) | 1998/7/30 | 13:00 | 14:00 | Section Meeting | 2F Conf. Rm., Hakozaki | |
| Hanako Suzuki (Hanako Suzuki / IBM) | 1998/7/22 | 16:00 | 17:30 | Planning Meeting | 3F Conf. Rm., Yamato | |
| Jiro Tanaka (Jiro Tanaka / IBM) | 1998/7/20 | 15:00 | 16:00 | Sales Meeting | 6F Conf. Rm., Hakozaki | ABCDEFG123456 |
| . | . | . | . | . | . | . |

[Figure 7]
240
Sum Schedule Managing Table
| Sum Schedule Number 241 | User Name (User ID) 243 |
|---|---|
| ABCDEFG123456 | Taro Yamada (Taro Yamada/IBM), Hanako Suzuki (Hanako Suzuki/IBM), Jiro Tanaka (Jiro Tanaka/IBM) |
| ⋮ | ⋮ |
[Figure 11]
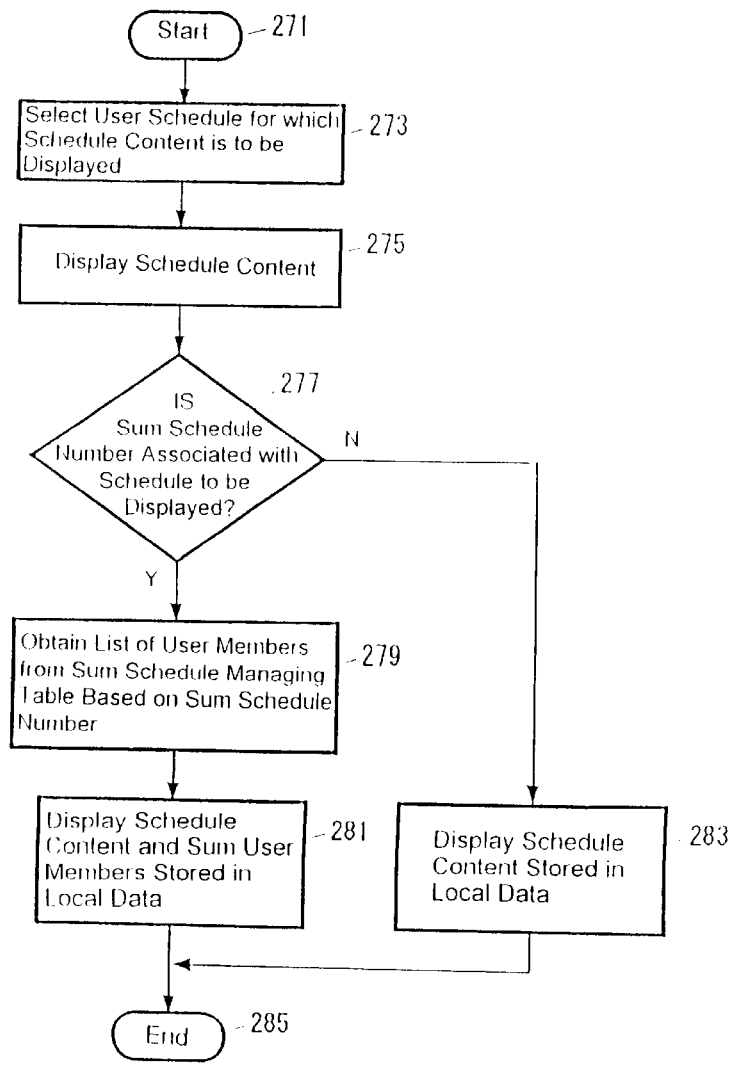

[Figure 8]
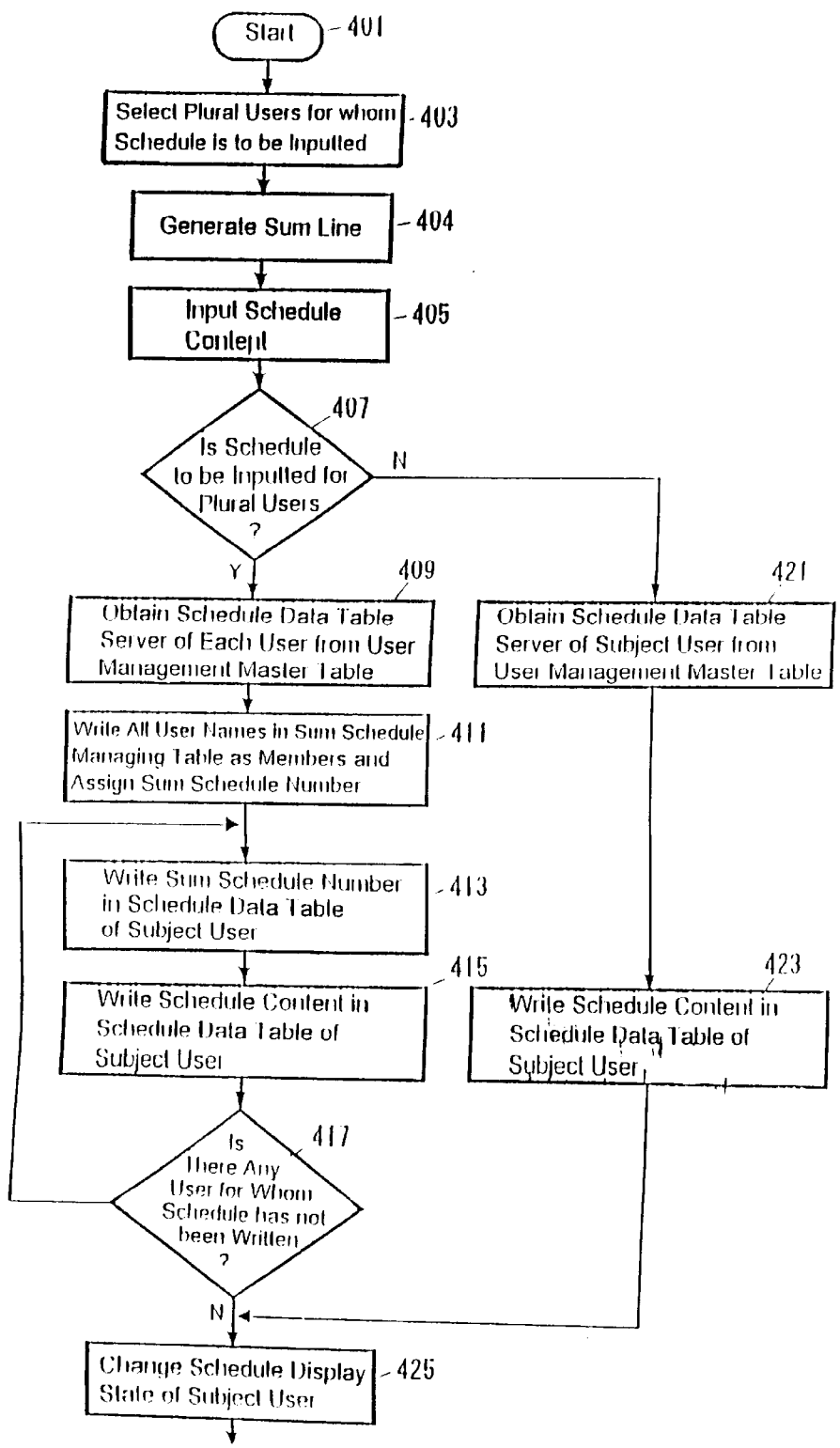

[Figure 9]
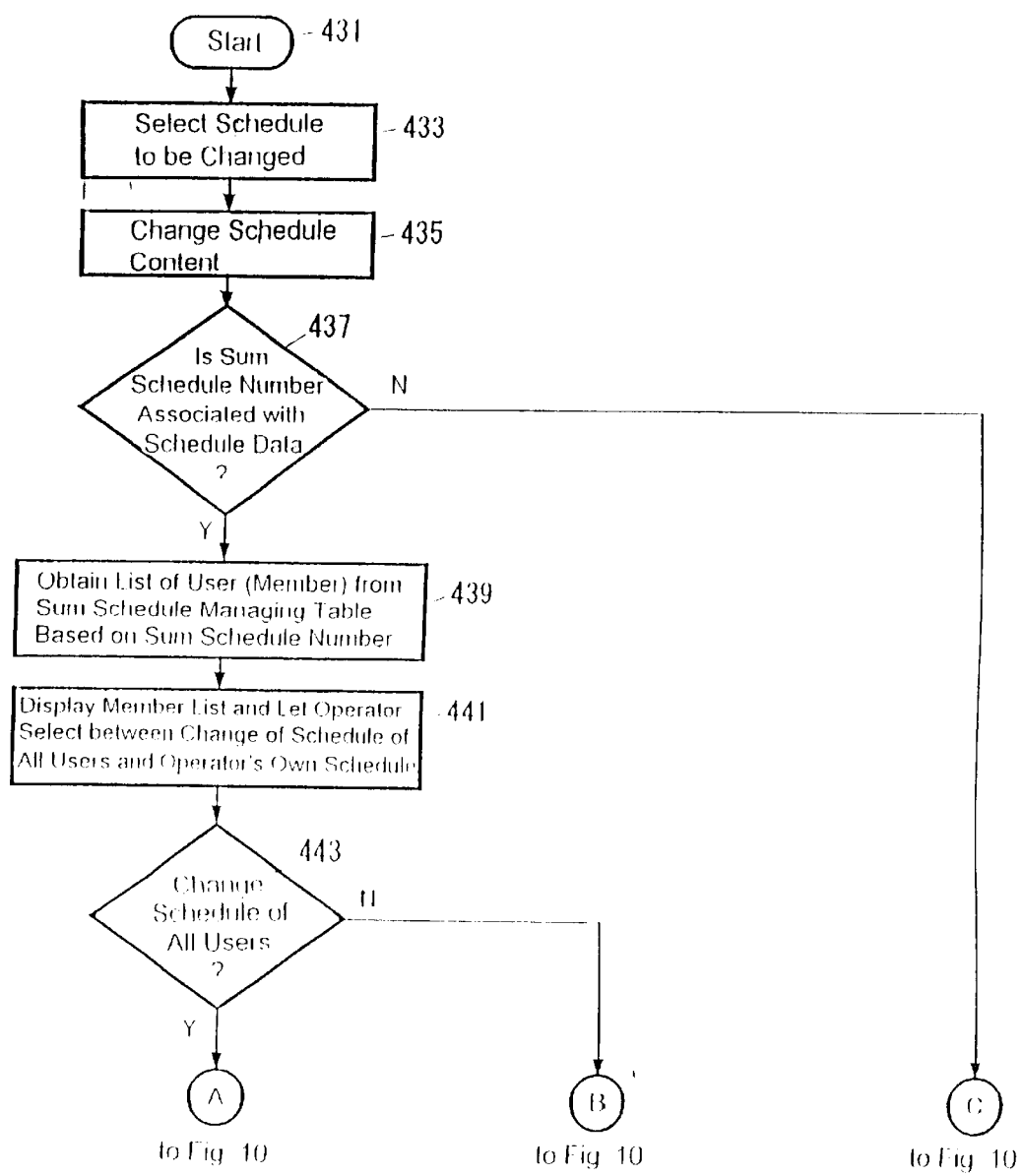

[Figure 10]
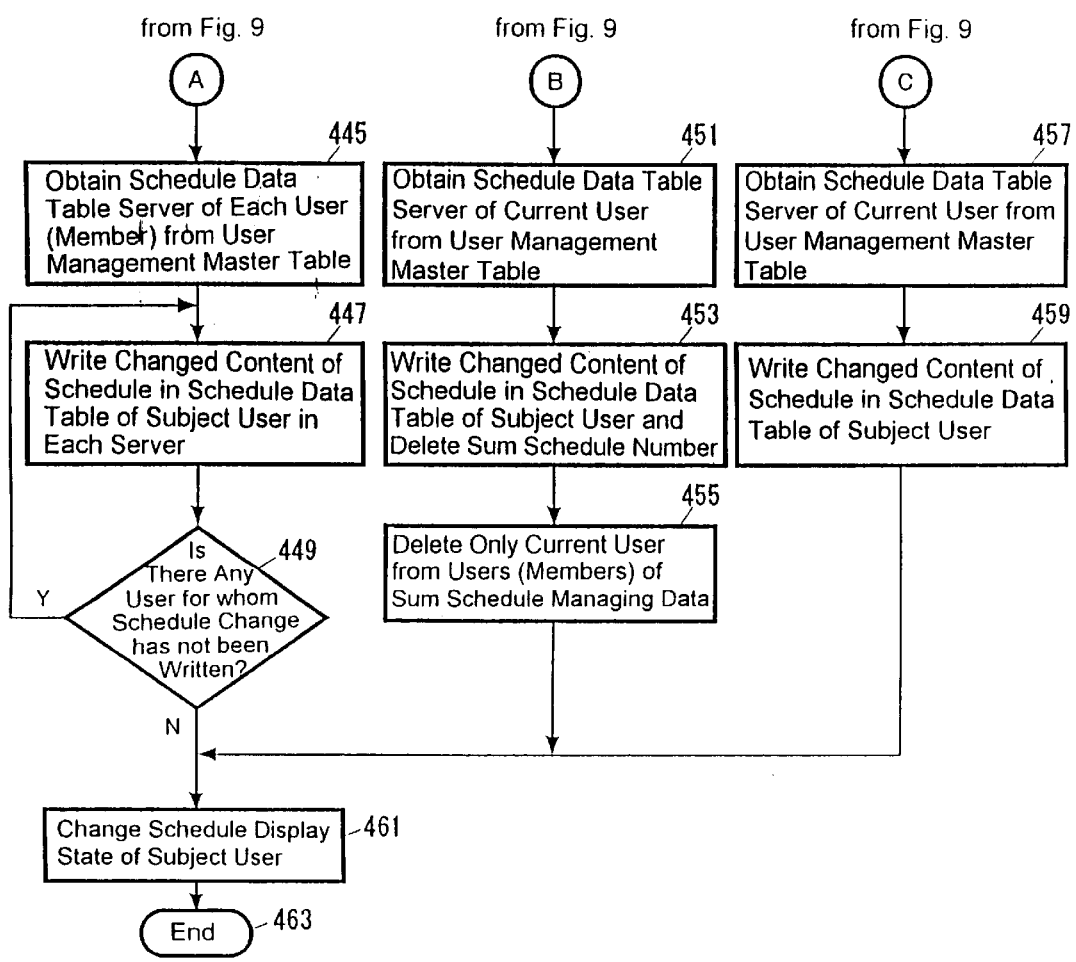

SCHEDULE MANAGEMENT SYSTEM AND METHOD FOR DISPLAYING, MANAGING, AND CHANGING A SCHEDULE AND RECORDING MEDIUM FOR STORING THE SAME

BACKGROUND OF THE INVENTION

1. Field of the Invention

This present invention relates to a scheme of managing a schedule and, more particularly, to a system and method of managing a schedule which allows a group schedule designating an arbitrary member to be effectively registered and managed.

2. Description of the Related Art

It is common practice that a plurality of people work on a same subject at a same time, such as on a conference, a customer call, an external education course, a business trip, a specific work task, network, and the like. There are many schedules which are not owned by a specific person and which do not have a common relationship other than "working together". In addition, these schedules may be subject to change or cancellation immediately prior to the scheduled event.

However, there is no schedule management apparatus which allows a schedule to be simply input for any plurality of users, and that can simply, through reference to the plurality of users, correctly and simultaneously adjust the multiple schedules. Many schedule management apparatus have to individually record and manage the individual schedules which is time consuming and labor intensive.

In the area relating to these problems, Japanese Published Unexamined Patent Application (PUPA) 8-22495, PUPA 6-96084 and PUPA 5-61876 exist. PUPA 8-22495 discloses a schedule management scheme which assigns a common ID number to related schedules to allow the related schedules to be managed as a group by retrieving the ID number.

However, it is necessary in this scheme to check all schedules for the same "related schedule ID" when searching schedules which are related to a particular schedule. Consequently, high speed processing is not possible when data is placed in a plurality of locations (servers) or in an environment with a slow data transfer speed such as a wide area network (WAN).

PUPA 8-22495 does not disclose a means for deleting a "related schedule ID" once it is written. Therefore, it is unable to flexibly cope with a user's request. In addition, because the display status cannot be changed unless all other user schedules are searched for every "related schedule ID", the number of items to be searched may be abnormally large especially when user's schedules extend over a plurality of days. This results in a deterioration of performance when changing the display status.

While PUPA 6-96084 also discloses a schedule management scheme for a plurality of users similar to PUPA 8-22495, it produces a common schedule for a plurality of users in a unit which corresponds to a virtual user such as an "organization" and a "role" rather than a schedule of individual users.

However, with this approach, a member belonging to an "organization" or a "role" cannot display their individual schedule unless they obtain a schedule which is related to themselves from the common schedule, such as an "organization" or a "role", and merges them together.

Further, assuming for example, that an event occurs in which a plurality of users having a certain role are supposed to visit a customer but one of them has to be immediately substituted by another user, this scheme can not flexibly cope with such an event because a group of user members such as an organization or a role has to be set-up beforehand in order to prepare a group schedule.

In addition, a problem results when an organizational change or a role change occurs, as this approach is not usable as a schedule LOG because only the schedule of an organization unit or a role unit was erased from the prior schedule hysteresis of the replaced user.

PUPA 6-12378 discloses a technology which allows a schedule for a plurality of persons to be displayed in calendar form at one time and allows the same schedule to be input for a plurality of persons globally. With this technology, a job name, a job code and a name code, etc., are prepared beforehand as a code master. In producing a schedule, an individual schedule is produced if the job name is not input, and, if the job name is input, the schedule is then managed as a job unit.

In this approach, a member cannot display their own schedule unless they obtain a common schedule based on their own "job code" from the "job master" beside their schedule and merges them together similar to PUPA 6-96084. In addition, a group schedule can not be prepared unless a job master is prepared beforehand.

In preparing a job master, a user of a same job is always assigned a same schedule unless the job master is modified in detail. Further, once a job master has been prepared and put in use, it is virtually impossible to modify the job master because all other schedules which are registered in a same job name are affected.

Further, this scheme cannot cope with the scenario where an alternate member is substituted on short notice to visit a customer in an organization change or a role change.

SUMMARY OF THE INVENTION

In view of the foregoing and other problems, disadvantages, and drawbacks of the conventional schedule management systems, the present invention has been devised.

It is an object of the invention to provide a method of managing a schedule which allows a group schedule designating an arbitrary member to be effectively registered and managed.

It is another object of this invention to provide a schedule management system which can flexibly cope with a change or a cancellation of a schedule of an entire group or a part thereof.

It is yet another object of this invention to provide a schedule management system which can flexibly cope with a change or an addition/deletion of a group member resulting from an organizational change.

It is another object of this invention to provide a schedule management system which can simply change from a group schedule to a normal schedule and vice versa.

It is a further object of this invention to provide a schedule management system which can concurrently hold a group schedule and a normal schedule and be able to distinguish them.

It is a further object of this invention to provide a schedule management system which can quickly update or add/delete a group member.

It is a further object of this invention to provide a schedule management system which synthesizes the information communicated as much as possible, reducing the system load.

It is a further object of this invention to provide a schedule management system which reduces resources required for execution.

By specifying a plurality of arbitrary users and registering a schedule, the schedule is registered for the plurality of users specified. A sum schedule number which the system automatically assigns is then generated and registered in the individual schedules of the plurality of users. The content of the schedule which is assigned a sum schedule number is reflected on the schedule of other users without the users changing the content of their schedule on the scheduler. In addition, by copying a sum schedule number to other users, they can be added as member users. By deleting the sum schedule number, the schedule can be changed to a normal schedule.

This invention also provides a method of displaying a schedule for a plurality of users on a schedule management apparatus which is provided with a display screen and an input device and manages personal schedule information registered for each of the plurality of users. The method includes detecting an operation specifying a plurality of users and indicating a schedule sum, obtaining user identification information which uniquely identifies each of the specified plurality of users, and displaying a sum schedule input area on the display screen to input a common schedule to the specified plurality of users in response to the operation.

The method further includes detecting that schedule information including a schedule starting time and a schedule ending time has been input into the sum schedule input area, generating a sum schedule number corresponding to the schedule information inputted to the sum schedule input area, registering the user identification information of the specified plurality of users in correlation to the sum schedule number, registering schedule information inputted in the sum schedule input area as personal schedule information for each of the specified plurality of users and registering the sum schedule number in correlation to the personal schedule information, and displaying a schedule of at least a part of the specified plurality of users based on the personal schedule information of those users.

The expression "operation specifying a plurality of users and indicating a schedule sum" refers to an operation of multi-selecting a desired user and clicking a sum icon in a tool bar, an operation of clicking a sum icon in the tool bar with one user being selected and then dragging and dropping another user name on a sum line. Also, the term "sum schedule input area" refers to not only the sum line shown in the embodiment to be described later but also to an entry for keyboard entry of schedule information. Further in this specification, the term "user identification information" may be information sufficiently identifying each user, such as a serial number assigned to a user, a user name and a user address, etc.

This invention provides, in another aspect thereof, a method of displaying a schedule of at least a part of a plurality of users on a schedule management apparatus which is provided with a display screen and an input device and manages personal schedule information registered for each of the plurality of users. This method includes obtaining user identification for a plurality of users, displaying a sum schedule input area on a display screen to input a common schedule for specified plurality of users corresponding to the user identification information of a plurality of users, and detecting that the schedule information has been input in the sum schedule input area. Additionally, the method includes generating a sum schedule number corresponding to the schedule information inputted in the sum schedule input area to register it in correlation to the user identification information, registering schedule information inputted in the sum schedule input area as personal schedule information of each of the specified plurality of users and registering the sum schedule number in correlation to the personal schedule information, and for displaying a schedule of at least a part of the corresponding plurality of users based on the personal schedule information of at least a part of the users.

This invention provides, in another aspect thereof, a method of displaying a schedule of at least a part of a plurality of users on a schedule management apparatus which is provided with a display screen and an input device and manages personal schedule information registered for each of the plurality of users. The method includes specifying a first user to register personal schedule information of the first user, specifying personal schedule information of the first user and indicating a schedule sum, generating a sum schedule number corresponding to the personal schedule information of the first user, registering the sum schedule number in correlation to the personal schedule information of the first user, registering the first user identification information of the specified first user in correlation to the sum schedule number, and specifying a second user. Additionally, the method includes registering the user identification information of the specified second user in correlation to the sum schedule number, and for generating personal schedule information of the second user corresponding to the personal schedule information of the first user.

This invention provides, in a still further aspect thereof, a method of displaying a schedule of at least a part of a plurality of users on a schedule management apparatus which is provided with a display screen and an input device and manages personal schedule information registered for each of the plurality of users. This method includes changing personal schedule information of a first user, and changing personal schedule information of a second user which is registered in correlation to a sum schedule number, which is registered in correlation to the personal schedule information of the first user, in correlation to the change of the personal schedule information of the first user.

This invention provides, in another aspect thereof, a method of displaying a schedule of at least a part of a plurality of users on a schedule management apparatus which is provided with a display screen and an input device and manages personal schedule information registered for each of the plurality of users. This method features specifying a user and displaying a user schedule change input area, detecting that a part of schedule information including a schedule starting time and a schedule ending time has been changed in the user schedule change input area, determining whether or not there exists a sum schedule number which is registered in correlation to the schedule information, obtaining user identification information registered in correlation to the sum schedule number when it is determined that there exists a sum schedule number which is registered in correlation to the schedule information, and changing the schedule information corresponding to the correlated registered user identification information in correlation to the change of the schedule information detected in the user schedule change input area.

This invention provides, in a further aspect thereof, a schedule management system which is provided with a display screen and an input device and manages personal schedule information registered for each of the plurality of users. The system includes an event detecting part for detecting an operation to specify user identification information of a plurality of users, a sum schedule input area generating part for generating a sum schedule input area on the display screen for inputting a common schedule to a plurality of users corresponding to the user identification information of the plurality of users, a sum schedule number generating part for generating a sum schedule number corresponding to the schedule information inputted in the sum schedule input area, a sum schedule managing table for registering the sum schedule number in correlation to the user identification information of the plurality of users, a user schedule managing table for registering the schedule information inputted in the sum schedule input area as personal schedule information of each of the specified plurality of users and registering the sum schedule number in correlation to the personal schedule information, and a display part for displaying a schedule of at least a part of the corresponding plurality of users based on the personal schedule information of at least a part of users.

This invention additionally provides, in a further aspect thereof, a schedule management system which is provided with a display screen and an input device and manages personal schedule information registered for each of the plurality of users. This system features a user schedule managing table for registering personal schedule information of a first user, an event detecting part for specifying personal schedule information of the first user and indicating a schedule sum, a sum schedule number generating part for generating a sum schedule number corresponding to the personal schedule information of first user, a sum schedule managing table for registering sum schedule number in correlation to the personal schedule information of first user, a table input/output part for registering sum schedule number in the user schedule managing table of specified first user, the event detecting part detecting an operation specifying a second user, the table input/output part registering the user identification information of specified second user in sum schedule managing table in correlation to sum schedule number, and a control part for generating personal schedule information of the second user corresponding to the personal schedule information of first user.

This invention provides, in a further aspect thereof, a schedule management system which is provided with a display screen and an input device and manages personal schedule information registered for each of the plurality of users. This aspect of a schedule management system has an event detecting part for detecting an operation changing personal schedule information of a first user and a control part for changing personal schedule information of a second user which is registered in correlation to a sum schedule number which is registered in correlation to the personal schedule information of the first user in correlation to the change of the personal schedule information of the first user.

This invention provides, in a further aspect thereof, a recording medium storing a schedule management program for displaying a schedule of at least a part of a plurality of users on a schedule management apparatus which is provided with a display screen and an input device and manages personal schedule information registered for each of the plurality of users. This program has a program code instructing the schedule management apparatus to detect an operation specifying a plurality of users and indicating a schedule sum, a program code instructing the schedule management apparatus to obtain user identification information which uniquely identifies each of the specified plurality of users, a program code instructing the schedule management apparatus to display a sum schedule input area on the display screen to input a common schedule to the specified plurality of users in response to the operation, a program code instructing the schedule management apparatus to detect that schedule information including a schedule starting time and a schedule ending time has been inputted in the sum schedule input area, a program code instructing the schedule management apparatus to generate a sum schedule number corresponding to the schedule information inputted in the sum schedule input area, a program code instructing the schedule management apparatus to register the user identification information of the specified plurality of users in correlation to the sum schedule number, a program code instructing the schedule management apparatus to register schedule information inputted in the sum schedule input area as personal schedule information of each of the specified plurality of users and registering the sum schedule number in correlation to the personal schedule information, and a program code instructing the schedule management apparatus to display a schedule of at least a part of the specified plurality of users based on the personal schedule information of the at least a part of users.

This invention further provides, in another aspect thereof, a recording medium storing a schedule management program for displaying a schedule of at least a part of a plurality of users on a schedule management apparatus which is provided with a display screen and an input device and manages personal schedule information registered for each of the plurality of users. The program includes a program code instructing said schedule management apparatus to obtain user identification of a plurality of users, a program code instructing the schedule management apparatus to display a sum schedule input area on the display screen to input a common schedule to the specified plurality of users corresponding to the user identification information of a plurality of users, a program code instructing the schedule management apparatus to detect that the schedule information has been inputted in the sum schedule input area, a program code instructing the schedule management apparatus to generate a sum schedule number corresponding to the schedule information inputted in the sum schedule input area to register it in correlation to the user identification information, a program code instructing the schedule management apparatus to register schedule information inputted in the sum schedule input area as personal schedule information of each of the specified plurality of users and registering the sum schedule number in correlation to the personal schedule information, and a program code instructing the schedule management apparatus to display a schedule of at least a part of the corresponding plurality of users based on the personal schedule information of the at least a part of users.

This invention provides, in a further aspect thereof, a recording medium storing a schedule management program for displaying a schedule of at least a part of a plurality of users on a schedule management apparatus which is provided with a display screen and an input device and manages personal schedule information registered for each of the plurality of users. This program features a program code instructing the schedule management apparatus to specify a first user to register personal schedule information of the first user, a program code instructing the schedule management apparatus to specify personal schedule information of the first user and indicating a schedule sum, a program code instructing the schedule management apparatus to generate a sum schedule number corresponding to the personal schedule information of the first user, a program code instructing the schedule management apparatus to register the sum schedule number in correlation to the personal schedule information of the first user, a program code instructing the schedule management apparatus to register the first user identification information of the specified first user in correlation to the sum schedule number, a program code instructing the schedule management apparatus to specify a second user, a program code instructing the schedule management apparatus to register the user identification information of the specified second user in correlation to the sum schedule number, and a program code instructing the schedule management apparatus to generate personal schedule information of the second user corresponding to the personal schedule information of the first user.

This invention provides, in a further aspect thereof, a recording medium storing a schedule management program for displaying a schedule of at least a part of a plurality of users on a schedule management apparatus which is provided with a display screen and an input device and manages personal schedule information registered for each of the plurality of users. The program has a program code instructing the schedule management apparatus to change personal schedule information of a first user, and a program code instructing the schedule management apparatus to change personal schedule information of a second user, which is registered in correlation to a sum schedule number which is registered in correlation to the personal schedule information of the first user, in correlation to the change of the personal schedule information of the first user.

This invention provides, in a further aspect thereof, a recording medium storing a schedule management program for displaying a schedule of at least a part of a plurality of users on a schedule management apparatus which is provided with a display screen and an input device and manages personal schedule information registered for each of the plurality of users. The program schedule management leaving a program code instructing the schedule management apparatus to specify a user and displaying a user schedule change input area, a program code instructing the schedule management apparatus to detect that a part of schedule information including a schedule starting time and a schedule ending time has been changed in the user schedule change input area, a program code instructing the schedule management apparatus to determine whether or not there exists a sum schedule number which is registered in correlation to the schedule information, a program code instructing the schedule management apparatus to obtain user identification information registered in correlation to the sum schedule number when it is determined that there exists a sum schedule number which is registered in correlation to the schedule information, and a program code instructing the schedule management apparatus to change the schedule information corresponding to the correlatedly registered user identification information in correlation to the change of the schedule information detected in the user schedule change input area.

The present disclosure relates to subject matter contained in Japanese Patent Application No. 10-225822, filed Aug. 10, 1998, which is expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which:

FIG. 1 is a schematic diagram showing an example of an operating state of a schedule management system utilizing this invention;

FIG. 2 is a schematic diagram showing an example of an operating state of a schedule management system utilizing this invention;

FIG. 3 is a block diagram showing a hardware configuration;

FIG. 4 is a block diagram of processing components of the present invention;

FIG. 5 is a schematic chart of a user managing master table in the preferred embodiment of the present invention;

FIG. 6 is a schematic chart of a user schedule data table in the preferred embodiment of the present invention;

FIG. 7 is a schematic chart of a sum schedule managing table in the preferred embodiment of the present invention;

FIG. 8 is a flow chart showing an example of a schedule input procedure of the present invention;

FIG. 9 is a flow chart showing an example of a schedule change procedure of the present invention;

FIG. 10 is a flow chart showing an example of a schedule change procedure of the present invention; and FIG. 11 is a flow chart showing an example of a procedure of displaying a schedule data of the present invention.

DETAILED DESCRIPTION OF THE PREFERRED EMBODIMENTS OF THE INVENTION

Referring now to the drawings, and more particularly to FIGS. 1–11, there are shown preferred embodiments of the method and structures according to the present invention.
Preferred Embodiment Referring to the drawings, a preferred embodiment of this invention is now described below. FIGS. 1 and 2 are schematic diagrams showing an example of the operational mode of a schedule management system utilizing this invention.

As shown in FIG. 1, on a schedule display window 300, a plurality of arbitrary users (301, 303) are selected and a "Sum" function is selected. A sum line 317 is displayed in which schedule lines of the plurality of users on a specific day are summed. The users may be persons or objects, such as a conference room or a liquid crystal projector.

In a preferred embodiment of this invention, the sum line 317 is set up so as to be displayed on the bottom line of the schedule display window and, if the number of users is too great to be displayed there, it is displayed in a scrollable state with a portion of the user schedule lines 311–315 being suppressed.

In a preferred embodiment of this invention, various methods are provided to specify a plurality of users and select the sum function. For example, desired users may be multi-selected among the user names 301–305 in the schedule display window 300 and a sum icon in a tool bar (not shown) may be clicked.

Alternatively, the sum icon in the tool bar may be clicked with one user being selected to display the sum line 317 and other users 301–305 may then be dragged and dropped in the sum line 317. While the sum line is displayed in a form in which it is added to the schedule display window 300 in this example, it may be generated as a separate window and displayed.

The sum function may also be selected by positioning a pointer at the user names 301–305 (selecting either a single user or multiple users) of the schedule display window 300 and clicking the right button of a mouse to display a pop up menu rather than clicking the sum icon of the tool bar as described in the example above. A list of designated users related to an organization may be obtained by selecting one or more organizations in an organization chart and the sum function.

While the invention may be modified in various ways for implementation purposes, the concept of this invention is not limited to any one of such implementations.

A mouse drag operation on the sum line 317 causes a schedule input window for a plurality of users to be displayed based on the sum members which are held as internal information. When a schedule registration is executed after a schedule content has been written, a unique sum schedule number is newly assigned and added to the sum schedule managing table 320 along with the members. The sum schedule number 321 is automatically assigned.

While it is described herein that the user schedule is managed by a user name for the purpose of facilitating a reader's understanding, it is preferred that the user schedule is managed by user index information in implementing this invention. The user index information is information which can uniquely identify an employee number and a user. This improves retrieval speed and allows for flexible modification of the system, for example, in the case of a change of a user name due to marriage, etc.

The schedule information input in sum line 317 is registered in a schedule data table 330 of a user who is recorded in the sum schedule managing table 320. The generated sum schedule number 321 is also recorded in each of the schedule data tables 330.

Then, the registered schedule is displayed in schedule lines 311, 313 of the schedule display window 300. In the preferred embodiment of this invention, the schedule data has a sum number which is displayed distinctly from other schedules so as to be immediately recognized as a sum schedule.

With reference to FIG. 2, a schematic diagram of a schedule change procedure of the schedule management system utilizing this invention is shown. As shown in FIG. 2, when a schedule for which a sum schedule is effected is changed in the schedule display window 300, the schedule management system 100 determines first whether or not a sum number is associated with the schedule data table. When a sum number is associated therewith, it is determined that this schedule is a sum schedule and, at the same time, an inputted user member reference is obtained and displayed, and a "prompt" appears asking the user whether to "change other user schedules at the same time" or to "change only your own schedule" on the display screen.

In the preferred embodiment of this invention, various methods are provided for changing the schedule. For example, this change can be implemented by specifying a designated user resulting in the schedule display window 300 being displayed and dragging a schedule bar 307, or by double clicking the schedule bar 307 to output the schedule input window to be outputted and changing the starting/ ending times or the setting date. While the preferred embodiment may be modified in various ways to implement the invention, the concept of this invention is not limited to any one of such implementations.

When the "change other user schedules at the same time" option is selected, the schedule for each user registered in the sum schedule managing table 320 is changed. When the "change only your own schedule" option is selected, the user is deleted from the members of the sum schedule managing table 320. The sum number 343 of the schedule data table 330 of that user is also deleted so that the schedule change is executed only for that user.

In the preferred embodiment of this invention, when the mouse is right clicked in the sum line 307, a pull down menu is displayed to allow a user the option to delete the sum line 307 and sum member information. When the option to delete the sum member is selected, a list of sum members is displayed. When the user selects a sum member to be deleted, the sum number is deleted from the corresponding schedule of the schedule data table for that member. The member is also deleted from the sum schedule managing table 320 (e.g., members 323 and 325).

FIG. 3 shows a schematic diagram of a hardware configuration for implementing a schedule management apparatus 100 of this invention. The schedule management apparatus 100 comprises a central processing unit (CPU) 1 and a memory 4. The CPU 1 and the memory 4 are connected to a hard disk device 13 as an auxiliary storage via a bus 2. A floppy disk device 20 (or medium drive devices 26, 28, 29, 30 such as magneto-optic (MO) 28, CD-ROM 26, 29) is connected to the bus 2 through a floppy disk controller 19 (or controllers such as an IDE controller 25, a SCSI controller 27, etc.).

A floppy disk (or a medium such as an MO, CD-ROM, etc.) is inserted to the floppy disk device 20 (or medium drive devices 26, 28, 29, 30 such as MO, CD-ROM,etc.). A computer program code which gives instructions to the CPU 1 in cooperation with an operating system is recorded in a recording medium such as a floppy disk, the hard disk device 13, ROM 14 and executed by being loaded in the memory 4. The computer program code may be compressed or divided into pieces for recording in a plurality of media.

Further, the schedule management apparatus 100 may be a system which is provided with user interface hardware including a pointing device 7 (a mouse, trackball, joystick, etc.) for inputting screen position information, a keyboard 6 supporting a keyed input and displays 11, 12 for presenting image data to the user. Further, a speaker 23 receives an audio signal from an audio controller 21 via an amplifier 22 for output as a voice.

The schedule management apparatus 100 of this invention can communicate, for example, with other computers and devices via a serial port 15 and a modem or a communication adapter 18 of a token ring.

This invention may be implemented by a conventional personal computer (PC), a workstation, a computer implemented in various home appliances such as a television and a facsimile equipment, or a combination thereof. While these components are mentioned as examples, they are not meant to limit possible combinations of components in the invention. Particularly, because this invention is for managing a schedule, components such as the serial port 15, the communication adapter card 18, the audio controller 21, the amplifier 22 and the speaker 23 are not indispensable components of this invention.

Preferably, the operating system includes an operating system which supports a GUI multi-windows environment as a standard such as Windows®, OS/2®, and X-WINDOW® System on AIX®, but it is not limited to any specific operating system environment.

While FIG. 3 shows a system in a stand alone environment, this invention may be implemented as a client/ server system in which a client machine is LAN connected to a server machine via Ethernet® and token ring, for example. A control part and managing tables, to be described further, are located in the server machine side with the rest of the functions located in the client machine side. As such, it is a matter of design choice as to where to locate functions in the server machine side and the client machine side. Various modifications including a combination of a plurality of machines and the distribution of functions among them for implementation are a concept included in this invention.

The system configuration of the invention is described with reference to FIG. 4.

In the preferred embodiment of this invention, the schedule management system comprises an input part 101, an event detecting part 103, a sum schedule number generating part 104, a control part 105, a table input/output part 106, a display control part 107, local data 108, a display part 109, a schedule display window generating part 111, a sum schedule line generating part 113, user schedule managing tables 121 and 131, sum schedule managing tables 123 and 133, and user management master tables 125 and 135.

The input part 101 obtains a signal from a pointing device such as a mouse, and converts it to event information. In the preferred embodiment of this invention, a device driver and an operating system supply this function. The event detecting part 103 interprets the content of the inputted event to determine the kind thereof.

The control part 105 controls the schedule display window generating part 111 and the sum schedule line generating part 113. The sum schedule number generating part 104 assigns a sum schedule number which is uniquely identifiable in the system. The table input/output part 106 accesses various tables existing locally or remotely to obtain and write content from and to the tables.

The display control part 107 generates and changes display data. The display part 109 converts information received from display control part 107 and sends it to the display device. In the preferred embodiment of this invention, the device driver and the operating system provide this function.

The user management master tables 125 and 135 are tables for managing the server location of user schedule information being managed by the schedule management system. The user management master tables 125 and 135 are tables which are located in all the servers in the schedule management system.

In the preferred embodiment of this invention, the integrity of data in the user management master table in each server is maintained by a replication (differential replication) operation performed between servers. This is implemented by an RDB (relational database) on a server which is utilized for storing data. A number of RDBs having such functionality are available and the invention is not limited to any one aspect of such technology.

FIG. 5 is a schematic chart of the user management master table in the preferred embodiment of the invention. As shown in FIG. 5, a user name (user ID) 211, a schedule data table server 213, a name section of user belongs 215 and other user information are managed in the user management master table 210 of the preferred embodiment of the invention. The schedule data table server 213 is address information to specify the server in which the schedule data table of each user is stored. The code representing a section to which each user belongs is managed in the "Name of Section User Belongs" portion 215.

The user schedule managing tables 121 and 131 (e.g., FIG. 4) are tables for managing the schedule information for each user. FIG. 6 is a schematic chart of the user schedule data table in the preferred embodiment of this invention. As shown in FIG. 6, a user name (user ID) 221, a date 223, a starting time 225, an ending time 227, a subject 229, a place 231, and a sum schedule number 233 are managed in the user schedule data table 220 in the preferred embodiment of this invention. The date, the starting time and the ending time when the schedule occurs are stored in the date 223, the starting time 225 and the ending time 227, respectively. Information of the subject, and the place of the schedule are also stored in the subject 229 and the place 231. The sum schedule number 233 is information for determining whether or not the schedule is managed as a sum schedule and with which user group the schedule is shared.

The sum schedule managing tables 123 and 133 are tables for specifying the member who is subject to the sum schedule and are located in the server of the member. FIG. 7 is a schematic chart of the sum schedule managing table in the preferred embodiment of this invention. As shown in FIG. 7, information of the user name (user ID) 243 corresponding to the sum schedule number 241 is stored in the sum schedule managing table 240 in the preferred embodiment of this invention.

While the functional blocks shown in FIG. 4 have been described, they are logical functional blocks and it is not meant that each of them is implemented as discrete hardware or software. They may be implemented by a composite or common hardware or software.

FIG. 8 is a flow chart showing a schedule input procedure in the preferred embodiment of this invention. When a plurality of users present in the system and a sum function are selected by an operator, the event detecting part 103 detects this selection and starts the procedure (e.g., blocks 401 and 403).

When the procedure is started, the control part 105 obtains a user name (user index information) and a specific date from the user's schedule which is a reference and instructs the sum schedule line generating part 113 to generate a sum line 317 in which the schedule lines of the specific date of a plurality of users are summed up. The display control part 107 delivers to display part 109 a view of information generated by the sum schedule line generating part 113. The sum line 317 is thus displayed on the display screen (block 404).

When a user makes an error (for example, a member other than the members specified in the sum line is dragged and dropped), the control part 105 instructs the sum schedule line generating part to regenerate the sum line 317.

When input by the operator of the schedule content is detected (block 405), it is determined if the schedule to be inputted is for a plurality of users. This is done by determining whether the mouse is dragged on the sum line 317 or on the user schedule lines 311 and 313 of the schedule display window 300 (block 407).

When the mouse is dragged on the sum line 317 or on the user schedule lines 311 and 313 of the schedule display window 300, the control part 105 instructs the sum schedule line generating part 113 and the schedule display window generating part 111 to generate a schedule bar.

When the schedule to be inputted is not for a plurality of users, the table input/output part 106 obtains an address of a schedule data table server of the subject user from the user managing master table 210 (block 421). The schedule data table server of that user is then accessed using the server address information and the contents of the schedule (e.g, date 223, starting/ending time 225, subject 229, place 231, etc.) are written into the schedule data table 220 of the subject user (block 423). The data which the table input/output part 106 obtained from various tables and the input part 101 is stored in the local data storage part 108 via the control part 105.

When the schedule to be inputted is for a plurality of users, the table input/output part 106 obtains the address of the schedule data table server of each user from the user managing master table 210 (block 409). While the table input/output part 106 obtains the address of the schedule data table server of each user from the user managing master table 210, after the operator has registered schedule information in this example, it may be obtained from the user managing master table 210 at the time of generating the schedule display window shown in FIG. 1 and saved in the local data storage part 108 (FIG. 4).

The control part 105 then instructs the sum schedule number generating part 104 to generate a sum schedule number 241 as a unique identifying number within the server, and instructs the table input/output part 106 to write the sum schedule number and all user names as members in the sum schedule managing table 240 in which subject users exist (block 411).

The table input/output part 106 then accesses the schedule data table server 220 of each user, based on the address of the schedule data table server of each user which is obtained in the block 409, and writes a sum schedule number and the content of the schedule (date 223, starting/ending time 225 and 227, subject 229, place 231, etc.) in the schedule data table 220 of the subject user (block 413, 415, 417).

The schedule display window 300 is then regenerated to change the schedule display status of the subject users (block 425). The display control part 107 sets the schedule data which contains a sum number with a display attribute (e.g., attribute such as color, mesh, underscore, etc.) which is distinct from other schedules so that it is instantly recognized as a sum schedule in the preferred embodiment of this invention.

FIGS. 9 and 10 are flow charts showing the procedure for changing a schedule in the preferred embodiment of this invention. When a schedule to be changed is selected by the operator and the content of the schedule is changed, the event detecting part 103 detects this operation and starts the procedure (e.g., blocks 431, 433 and 435).

The control part 105 accesses the local data storage part 108 and determines if the schedule to be changed is associated with a sum schedule number (block 437).

When the schedule to be changed is not associated with a sum schedule number, the user managing master table 210 is accessed to obtain the address 213 of the schedule data table server of the user of the schedule to be changed (block 457). The schedule data table 220 of that user is then accessed using the address information 213 and the changed content of the schedule is written therein (e.g., date 223, starting time 225, ending time 227, subject 229 or place 231 is changed) (block 459).

When the schedule to be changed is associated with a sum schedule number, the sum schedule managing table 240 is first accessed to obtain a list of users 243 of that sum schedule number 241 (block 439). A member list is then displayed on the display screen, and a display is then output asking the operator if he wants to change the schedule of each user or to change only the operator's own schedule (the schedule to be changed) (block 441).

When the operator chooses to change the schedules of all the users, the user managing master table 210 is accessed to obtain the address 213 of the schedule data table server of all the users (blocks 443 and 445). The schedule data table 220 of all the users is then accessed based on this address information 213 to write the changed content of the schedule (blocks 447 and 449).

When the operator selects to change only that user's schedule, the user managing master table 210 is accessed to obtain the address 213 of the schedule data table server of that user (block 451) and the schedule is changed in the schedule data table 220 of the subject user based on this address information (block 453). At this time, the sum schedule number is deleted in the schedule data table 220 of the subject user (block 453). The sum schedule managing table 240 is accessed to remove this user from the sum members to delete that user (block 455).

When these schedule changes are done, the schedule display window 300 is regenerated to change the schedule display status of the subject users (block 461). In the preferred embodiment of this invention, the attribute (e.g., color, mesh, underscore, etc.) of the schedule data in which the sum number is deleted is restored so that it can be instantly recognized as being a normal schedule which is not summed.

FIG. 11 is a flow chart showing a schedule display procedure in the preferred embodiment of this invention. As an additional function of this invention, in displaying a schedule which is registered as a sum schedule, other group members are displayed to enable finding quickly the other members of the shared schedule.

When the schedule to be displayed is selected and an operation instructs that the content be displayed, the event detecting part 103 detects this instruction and starts the procedure (blocks 271–275).

The control part 105 accesses the local data storage part 108 to determine whether or not a sum schedule number is associated with the schedule to be changed (block 277). When a sum schedule number is not associated with the schedule to be changed, a schedule stored in the local data storage part 108 is displayed as a normal schedule (block 283).

When a sum schedule number is associated with the schedule to be changed, the sum schedule managing table 234 is accessed to obtain a user list 233 of that sum schedule number (block 279). The schedule and the user members which are stored in the local data storage part 108 are then displayed (block 281).

As described in the above, this invention efficiently copes with a change or a cancellation of an entire group or a part thereof, or a change and an addition/deletion of a group member accompanying an organization change without compelling the operator to do a cumbersome operation.

In addition, a change from a group schedule to a normal schedule and vice versa can be done at high speed with a simple operation.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A method of displaying a schedule of at least a part of a plurality of users on a schedule management apparatus including a display screen and an input device, and manages personal schedule information registered for each of the plurality of users, the method comprising:

obtaining user identification information which uniquely identifies each of said specified plurality of users;

displaying a sum schedule input area on said display screen to input a common schedule to said specified plurality of users in response to said operation;

detecting that schedule information including a schedule starting time and a schedule ending time has been inputted in said sum schedule input area;

generating a sum schedule number corresponding to the schedule information inputted in said sum schedule input area;

registering schedule information inputted in said sum schedule input area as personal schedule information of each of said specified plurality of users and registering said sum schedule number in correlation to said personal schedule information; and displaying a schedule of at least a part of said specified plurality of users based on the personal schedule information of said at least a part of said plurality of users.

2. A method of displaying a schedule as claimed in claim 1, said method further comprising:

detecting an operation specifying a plurality of users and indicating a schedule sum; and registering the user identification information of said specified plurality of users in correlation to said sum schedule number.

3. A method as claimed in claim 2, wherein said operation specifying a plurality of users and indicating a schedule sum comprises an operation of multi-selecting a desired user and clicking a sum icon in a tool bar.

4. A method as claimed in claim 2, wherein said operation specifying a plurality of users and indicating a schedule sum comprises an operation of clicking a sum icon in the tool bar with one user being selected and then dragging and dropping another user name on a sum line.

5. A method of displaying a schedule of at least a part of a plurality of users on a schedule management apparatus which is provided with a display screen and an input device and manages personal schedule information registered for each of the plurality of users, said method comprising:

specifying a first user to register personal schedule information of the first user;

specifying personal schedule information of said first user and indicating a schedule sum;

generating a sum schedule number corresponding to the personal schedule information of said first user;

registering said sum schedule number in correlation to the personal schedule information of said first user;

registering the first user identification information of said specified first user in correlation to said sum schedule number;

specifying a second user;

registering the user identification information of said specified second user in correlation to said sum schedule number; and generating personal schedule information of the second user corresponding to the personal schedule information of said first user.

6. A method of displaying a schedule of at least a part of a plurality of users on a schedule management apparatus which is provided with a display screen and an input device and manages personal schedule information registered for each of the plurality of users, said method comprising:

changing personal schedule information of a first user; and changing personal schedule information of a second user which is registered in correlation to a sum schedule number, which is registered in correlation to the personal schedule information of said first user, in correlation to the change of the personal schedule information of the first user.

7. A method of displaying a schedule of at least a part of a plurality of users on a schedule management apparatus which is provided with a display screen and an input device and manages personal schedule information registered for each of the plurality of users, said method comprising:

specifying a user and displaying a user schedule change input area;

detecting that a part of schedule information including a schedule starting time and a schedule ending time has been changed in said user schedule change input area;

determining whether or not there exists a sum schedule number which is registered in correlation to said schedule information;

obtaining user identification information registered in correlation to said sum schedule number when it is determined that here exists a sum schedule number which is registered in correlation to said schedule information; and changing the schedule information corresponding to said correlatedly registered user identification information in correlation to the change of the schedule information detected in said user schedule change input area.

8. A schedule management system which is provided with a display screen and an input device and manages personal schedule information registered for each of the plurality of users, said system comprising:

an event detecting part for detecting an operation to specify user identification information of a plurality of users;

a sum schedule input area generating part for generating a sum schedule input area on said display screen for inputting a common schedule to a plurality of users corresponding to said user identification information of the plurality of users;

a sum schedule number generating part for generating a sum schedule number corresponding to the schedule information inputted in said sum schedule input area;

a sum schedule managing table for registering said sum schedule number in correlation to the user identification information of the plurality of users;

a user schedule managing table for registering the schedule information inputted in said sum schedule input area as personal schedule information of each of said specified plurality of users and registering said sum schedule number in correlation to said personal schedule information; and a display part for displaying a schedule of at least a part of said corresponding plurality of users based on the personal schedule information of said at least a part of said users.

9. A system as claimed in claim 8, wherein said operation to specify a plurality of users and indicating a schedule sum comprises an operation of multi-selecting a desired user and clicking a sum icon in a tool bar.

10. A system as claimed in claim 8, wherein said operation to specify a plurality of users and indicating a schedule sum comprises an operation of clicking a sum icon in the tool bar with one user being selected and then dragging and dropping another user name on a sum line.

11. A schedule management system which is provided with a display screen and an input device and manages personal schedule information registered for each of the plurality of users, said system comprising:

a user schedule managing table for registering personal schedule information of a first user;

an event detecting part for specifying personal schedule information of said first user and indicating a schedule sum;

a sum schedule number generating part for generating a sum schedule number corresponding to the personal schedule information of said first user;

sum schedule managing table for registering said sum schedule number in correlation to the personal schedule information of said first user;

a table input/output part for registering said sum schedule number in the user schedule managing table of said specified first user;

said event detecting part detecting an operation specifying a second user;

said table input/output part registering the user identification information of said specified second user in said sum schedule managing table in correlation to said sum schedule number; and a control part for generating personal schedule information of the second user corresponding to the personal schedule information of said first user.

12. A schedule management system which is provided with a display screen and an input device and manages personal schedule information registered for each of the plurality of users, said system comprising:

an event detecting part for detecting an operation changing personal schedule information of a first user; and a control part for changing personal schedule information of a second user which is registered in correlation to a sum schedule number which is registered in correlation to the personal schedule information of said first user in correlation to the change of the personal schedule information of the first user.

13. A recording medium storing a schedule management program for displaying a schedule of at least a part of a plurality of users on a schedule management apparatus which is provided with a display screen and an input device and manages personal schedule information registered for each of the plurality of users, said program comprising:

a program code instructing said schedule management apparatus to detect an operation specifying a plurality of users and indicating a schedule sum;

a program code instructing said schedule management apparatus to obtain user identification information which uniquely identifies each of said specified plurality of users;

a program code instructing said schedule management apparatus to display a sum schedule input area on said display screen to input a common schedule to said specified plurality of users in response to said operation;

a program code instructing said schedule management apparatus to detect that schedule information including a schedule starting time and a schedule ending time has been inputted in said sum schedule input area;

a program code instructing said schedule management apparatus to generate a sum schedule number corresponding to the schedule information inputted in said sum schedule input area;

a program code instructing said schedule management apparatus to register the user identification information of said specified plurality of users in correlation to said sum schedule number;

a program code instructing said schedule management apparatus to register schedule information inputted in said sum schedule input area as personal schedule information of each of said specified plurality of users and registering said sum schedule number in correlation to said personal schedule information; and a program code instructing said schedule management apparatus to display a schedule of at least a part of said specified plurality of users based on the personal schedule information of said at least a part of users.

14. A recording medium as claimed in claim 13, wherein said operation specifying a plurality of users and indicating a schedule sum comprises an operation of multi-selecting a desired user and clicking a sum icon in a tool bar.

15. A recording medium as claimed in claim 13, wherein said operation specifying a plurality of users and indicating a schedule sum comprises an operation of clicking a sum icon in the tool bar with one user being selected and then dragging and dropping another user name on a sum line.

16. A recording medium storing a schedule management program for displaying a schedule of at least a part of a plurality of users on a schedule management apparatus which is provided with a display screen and an input device and manages personal schedule information registered for each of the plurality of users, said program comprising:

a program code instructing said schedule management apparatus to obtain user identification of a plurality of users;

a program code instructing said schedule management apparatus to display a sum schedule input area on said display screen to input a common schedule to said specified plurality of users corresponding to said user identification information of a plurality of users;

a program code instructing said schedule management apparatus to detect that the schedule information has been inputted in said sum schedule input area;

a program code instructing said schedule management apparatus to generate a sum schedule number corresponding to the schedule information inputted in said sum schedule input area to register it in correlation to said user identification information;

a program code instructing said schedule management apparatus to register schedule information inputted in said sum schedule input area as personal schedule information of each of said specified plurality of users and registering said sum schedule number in correlation to said personal schedule information; and a program code instructing said schedule management apparatus to display a schedule of at least a part of said corresponding plurality of users based on the personal schedule information of said at least a part of users.

17. A recording medium storing a schedule management program for displaying a schedule of at least a part of a plurality of users on a schedule management apparatus which is provided with a display screen and an input device and manages personal schedule information registered for each of the plurality of users, said program comprising:

a program code instructing said schedule management apparatus to specify a first user to register personal schedule information of the first user;

a program code instructing said schedule management apparatus to specify personal schedule information of said first user and indicating a schedule sum;

a program code instructing said schedule management apparatus to generate a sum schedule number corresponding to the personal schedule information of said first user;

a program code instructing said schedule management apparatus to register said sum schedule number in correlation to the personal schedule information of said first user;

a program code instructing said schedule management apparatus to register the first user identification information of said specified first user in correlation to said sum schedule number;

a program code instructing said schedule management apparatus to specify a second user, a program code instructing said schedule management apparatus to register the user; identification information of said specified second user in correlation to said sum schedule number; and a program code instructing said schedule management apparatus to generate personal schedule information of the second user corresponding to the personal schedule information of said first user.

18. A recording medium storing a schedule management program for displaying a schedule of at least a part of a plurality of users on a schedule management apparatus which is provided with a display screen and an input device and manages personal schedule information registered for each of the plurality of users, said program comprising:

a program code instructing said schedule management apparatus to change personal schedule information of a first user; and a program code instructing said schedule management apparatus to change personal schedule information of a second user, which is registered in correlation to a sum schedule number which is registered in correlation to the personal schedule information of said first user, in correlation to the change of the personal schedule information of the first user.

19. A recording medium storing a schedule management program for displaying a schedule of at least a part of a plurality of users on a schedule management apparatus which is provided with a display screen and an input device and manages personal schedule information registered for each of the plurality of users, said program comprising:

a program code instructing said schedule management apparatus to specify a user and displaying a user schedule change input area;

a program code instructing said schedule management apparatus to detect that a part of schedule information including a schedule starting time and a schedule ending time has been changed in said user schedule change input area;

a program code instructing said schedule management apparatus to determine whether or not there exists a sum schedule number which is registered in correlation to said schedule information;

a program code instructing said schedule management apparatus to obtain user identification information registered in correlation to said sum schedule number when it is determined that here exists a sum schedule number which is registered in correlation to said schedule information; and a program code instructing said schedule management apparatus to change the schedule information corresponding to said correlatedly registered user identification information in correlation to the change of the schedule information detected in said user schedule change input area.

20. A recording medium as claimed in claim 19, wherein said specifying a user and indicating said sum schedule number comprises multi-selecting a desired user and clicking a sum icon in a tool bar.

* * * * *

Disclaimer 6,392,669 — Nobumitsu Matoba, Yokohama; Kenichi Nagashima; Michikazu Hirota, both of Machida, all of Japan. SCHEDULE MANAGEMENT SYSTEM AND METHOD FOR DISPLAYING, MANAGING, AND CHANGING A SCHEDULE AND RECORDING MEDIUM FOR STORING THE SAME. Patent dated May 21, 2002. Disclaimer filed Oct. 4, 2006, by the assignee, International Business Machines Corporation.

Hereby enters this disclaimer to all claims of said patent.

*(Official Gazette February 27, 2007)*